US011953928B2

United States Patent
Maccioni et al.

(10) Patent No.: US 11,953,928 B2
(45) Date of Patent: Apr. 9, 2024

(54) ELECTRIC CIRCUIT ARRANGEMENT TO CONTROL CURRENT GENERATION

(71) Applicant: Sciosense B.V., AE Eindhoven (NL)

(72) Inventors: Alberto Maccioni, La Spezia (IT); Massimiliano Franzolin, Pontedera (IT); Monica Schipani, Pisa (IT); Fabrizio Mannozzi, La Spezia (IT)

(73) Assignee: Sciosense B.V., AE Eindhoven (NL)

( * ) Notice: Subject to any disclaimer, the term of this patent is extended or adjusted under 35 U.S.C. 154(b) by 395 days.

(21) Appl. No.: 17/287,465

(22) PCT Filed: Sep. 26, 2019

(86) PCT No.: PCT/EP2019/076047

§ 371 (c)(1),
(2) Date: Apr. 21, 2021

(87) PCT Pub. No.: WO2020/083603

PCT Pub. Date: Apr. 30, 2020

(65) Prior Publication Data

US 2022/0004216 A1 Jan. 6, 2022

(30) Foreign Application Priority Data

Oct. 24, 2018 (EP) .................................... 18202378

(51) Int. Cl.
*G05F 3/26* (2006.01)
*G05F 3/24* (2006.01)

(52) U.S. Cl.
CPC .............. *G05F 3/262* (2013.01); *G05F 3/245* (2013.01)

(58) Field of Classification Search
CPC ..... G05F 3/00; G05F 3/02; G05F 3/08; G05F 3/16; G05F 3/225; G05F 3/245;
(Continued)

(56) References Cited

U.S. PATENT DOCUMENTS 7,295,140 B2 * 11/2007 Chuang .................. H03M 3/34 341/143
7,652,863 B2 1/2010 Ito et al.
(Continued)

FOREIGN PATENT DOCUMENTS

CN 2751314 Y 1/2006
CN 1991659 A 7/2007
(Continued)

OTHER PUBLICATIONS

Liu, et al., "A 14-Bit 1.0-GS/s Dynamic Element Matching DAC with >80 dB SFDR up to the Nyquist," IEEE International Symposium on Circuits and Systems (ISCAS), May 24-27, 2015, pp. 1026-1029.

*Primary Examiner* — Scott Bauer
*Assistant Examiner* — Carlos O Rivera-Perez
(74) *Attorney, Agent, or Firm* — Slater Matsil, LLP

(57) ABSTRACT

In an embodiment an electric circuit arrangement includes a current generator circuit having a first output terminal and configured to generate an output current, a controller configured to generate control signals to control the current generator circuit, a random code generator configured to generate random codes and a counter configured to generate a count, wherein the current generator circuit comprises a plurality of output current paths and a plurality of controllable switching circuits, wherein each of the output current paths includes a respective electrical component to define a current in the respective output current path, wherein a respective one of the controllable switching circuits is coupled to a respective one of the output current paths to connect the respective electrical component to the first output terminal, and wherein the random code generator is configured to provide a respective code derived from a respective one of the random codes.

15 Claims, 4 Drawing Sheets

(58) Field of Classification Search
CPC . G05F 3/26; G05F 3/262; G05F 3/265; G05F 3/267; G06F 7/00; G06F 7/58–588; H03M 1/066–0673; H03M 1/66–687
USPC ......... 323/271–275, 304–317, 351; 327/132, 327/530, 534, 535, 538–543
See application file for complete search history.

(56) References Cited

U.S. PATENT DOCUMENTS

| | | | |
|---|---|---|---|
| 9,323,273 | B2 | 4/2016 | Wang et al. |
| 10,678,280 | B2 | 6/2020 | Cho et al. |
| 2002/0026469 | A1 | 2/2002 | Bugeja et al. |
| 2004/0227499 | A1 | 11/2004 | Date et al. |
| 2006/0255841 | A1 | 11/2006 | Schaffer et al. |
| 2012/0194264 | A1 | 8/2012 | Chamakura |
| 2013/0259091 | A1 | 10/2013 | Chen et al. |
| 2015/0286240 | A1 | 10/2015 | Whitten |
| 2016/0118978 | A1 | 4/2016 | Ahn |
| 2016/0147247 | A1 | 5/2016 | Roham et al. |

FOREIGN PATENT DOCUMENTS

| | | | |
|---|---|---|---|
| CN | 105375928 | A | 3/2016 |
| CN | 106997219 | A | 8/2017 |

* cited by examiner

FIG 5

| LFSR OUTPUT[19:0] | LFSR[19:17] | Counter | Selected output | Mirror control |
|---|---|---|---|---|
| B6D51 | 5 | 0 | 5 | 100000 |
| 6DAA3 | 3 | 0 | 3 | 001000 |
| DB546 | 6 | 0 | 0 | 000001 |
| B6A8C | 5 | 1 | 5 | 100000 |
| 6D518 | 3 | 1 | 3 | 001000 |
| DAA30 | 6 | 1 | 1 | 000010 |
| B5461 | 5 | 2 | 5 | 100000 |
| 6A8C3 | 3 | 2 | 3 | 001000 |
| D5186 | 6 | 2 | 2 | 000100 |
| AA30C | 5 | 3 | 5 | 100000 |
| 54618 | 2 | 3 | 2 | 000100 |
| A8C30 | 5 | 3 | 5 | 100000 |
| 51861 | 2 | 3 | 2 | 000100 |
| A30C2 | 5 | 3 | 5 | 100000 |
| 46185 | 2 | 3 | 2 | 000100 |
| 8C30B | 4 | 3 | 4 | 010000 |
| 18617 | 0 | 3 | 0 | 000001 |
| 30C2F | 1 | 3 | 1 | 000010 |
| 6185F | 3 | 3 | 3 | 001000 |
| C30BF | 6 | 3 | 3 | 001000 |
| 8617E | 4 | 4 | 4 | 010000 |
| 0C2FC | 0 | 4 | 0 | 000001 |
| 185F9 | 0 | 4 | 0 | 000001 |
| 30BF2 | 1 | 4 | 1 | 000010 |
| 617E4 | 3 | 4 | 3 | 001000 |
| C2FC9 | 6 | 4 | 4 | 010000 |
| 85F93 | 4 | 5 | 4 | 010000 |
| 0BF27 | 0 | 5 | 0 | 000001 |
| 17E4F | 0 | 5 | 0 | 000001 |
| 2FC9F | 1 | 5 | 1 | 000010 |
| 5F93F | 2 | 5 | 2 | 000100 |
| BF27F | 5 | 5 | 5 | 100000 |
| 7E4FE | 3 | 5 | 3 | 001000 |
| FC9FD | 7 | 5 | 5 | 100000 |
| F93FA | 7 | 0 | 0 | 000001 |
| F27F5 | 7 | 1 | 1 | 000010 |

ELECTRIC CIRCUIT ARRANGEMENT TO CONTROL CURRENT GENERATION

This patent application is a national phase filing under section 371 of PCT/EP2019/076047, filed Sep. 26, 2019, which claims the priority of European patent application 18202378.8, filed Oct. 24, 2018, each of which is incorporated herein by reference in its entirety.

TECHNICAL FIELD

The disclosure relates to an electric circuit arrangement to control a current generation, wherein an output current is generated as a defined ratio of a reference current.

BACKGROUND

For a plurality of applications, it is desired to provide a current being derived from a reference current, wherein the generated current and the reference current have a defined ratio. The ratio can be obtained by summing a number of partial currents respectively flowing through a certain number of unit elements, for example a transistor, a capacitor, a resistor, etc., in order to get a rational factor.

An example of a typical current generator circuit to generate an output current with a defined ratio in relation to a reference current is a current mirror circuit. A current mirror circuit usually comprises an input current path with a precise current source to generate a reference current. The reference current is mirrored in a plurality of output current paths. Each of the output current paths includes a mirror transistor. In order to generate an output current having a defined ratio in relation to the reference current, a certain number of the output current paths is connected to an output terminal so that the partial output currents flowing through the output current paths are summed at the output terminal.

In order to generate the output current precisely with a predefined ratio, it will be necessary that the respective electrical components, for example, the respective transistors, arranged in each of the output current paths are manufactured with a defined exact geometrical size. Those elements, however, are usually not exactly identical because they suffer from a mismatch error, which is usually a function of their geometrical size.

SUMMARY

Embodiments provide an electric circuit arrangement to control current generation, wherein a mismatch of electrical components being included in output current paths of a current generator circuit of the circuit arrangement is reduced so that an output current is generated with a precise ratio in relation to a reference current.

According to an embodiment of the electric circuit arrangement, the electric circuit arrangement to control current generation comprises a current generator circuit having a first output terminal to generate an output current, a controller to generate control signals to control the current generator circuit, a random code generator to generate random codes, and a counter to generate a count. The current generator circuit comprises a plurality of output current paths. Each of the output current paths includes a respective electrical component to define a current in the respective output current path. Furthermore, the current generator circuit comprises a plurality of controllable switching circuits, wherein a respective one of the controllable switching circuits is coupled to a respective one of the output current paths to connect the respective electrical component to the first output terminal. The random code generator is configured to provide a respective code derived from a respective one of the random codes. The controller is configured to use the respective derived code or the count depending on the derived code to generate a respective one of the control signals to control a respective one of the controllable switching circuits of the current generator circuit.

In order to reduce the effect of mismatch between the electrical components included in the output current paths, the electric circuit arrangement is embodied to dynamically re-group the electrical components of the various output current paths by varying the composition of the groups. As a result, the average ratio of an output current in relation to a reference current is closer to an ideal value than if always predefined electrical components of each of the output current paths are used to generate the output current. The electric circuit arrangement thus uses dynamic element matching to generate an output current with a precise relationship in relation to a reference current.

The current generator circuit comprises N+1 output current paths, wherein N of these output current paths may be connected to the first output terminal by a respective one of the controllable switching circuits coupled to the respective output current path. Furthermore, one of the output current paths is connected to the second output terminal by one of the controllable switching circuits that is coupled to said one of the output current paths. In comparison to a rotation-based dynamic element matching approach, the technique realized by the proposed electric circuit arrangement combines the generation of a pseudo-random sequence/code generated by the random code generator with the generation of a count generated by a counter. The count may be generated by the counter as a random code from 0 to N.

According to a possible embodiment, the random code generator may be embodied as a linear feedback shift register (LFSR) to generate the pseudo-random sequence/code. The linear feedback shift register has a number X of outputs/storage cells, wherein a portion of a number M of the X storage cells are used to provide the derived code. For this purpose, the number M of the X storage cells is embodied as storage cells to be evaluated which are combined to produce the derived random code. If each of the storage cells to be evaluated includes a binary value, a derived random code between a decimal value 0 and a decimal value $2^M-1$ can be generated by the M storage cells to be evaluated.

In order to select the N output current paths to be connected to the first output terminal and the one output current path to be connected to the second output terminal, N+1 of the derived codes of the random code generator are required to determine the distribution of the output current paths to the first and second output terminal. The electric circuit arrangement is configured such that a derived code generated by the random code generator is omitted and rather the count/random code generated by the counter is selected in case an illegal/non-permitted derived code is produced by the random code generator. An illegal code non-permitted to generate the control signals is a code, for example a binary or hexadecimal code, corresponding to a decimal value being larger than N. A derived code permitted to generate the control signals corresponds to a decimal value lower than or equal to N.

Using a linear feedback shift register to generate the random codes/derived codes together with an auxiliary counter to generate an additional code, in order to generate the control signals, is a technique used by the proposed electric circuit arrangement that can overcome the limitation of the generation of 2N codes given by the linear shift register alone. Furthermore, the programmable counter allows extending the proposed modified dynamic element matching method to an arbitrary number of codes at run time.

The main difference compared with a rotation-based dynamic element matching method is that the grouping of the respective electrical components of the output current paths is pseudo-random so that it does not repeat with a period of N. In contrast to the proposed modified dynamic element matching used by the electric circuit arrangement, a rotation-based dynamic element matching repeats a code with a small period, typically equal to the number of elements to be rotated. This is equivalent to injecting a tone at a specific frequency, which can cause side effects depending on the architecture in which the dynamic element matching is used.

For example, if a current mirror with an implemented rotation-based dynamic element matching method is used in combination with an on-board sigma-delta analog-to-digital converter so that the rotation-based dynamic element matching interferes with the operation of the on-board sigma-delta analog-to-digital converter, the effect is a sharp increase in output noise and the presence of strong non-linearities at specific input levels. However, the ideal situation would be to excite all codes without periodic signals and with a flat histogram, which means that all codes should be used the same number of times.

Compared with an alternative implementation that uses a linear feedback shift register and a modulo N circuit, the proposed electric circuit arrangement is less costly in terms of area and is less time-critical so it can be employed with a high frequency. Moreover, the difference in gate count is low for low values of N but increases with N as shown in the comparison table below.

| N | Gate count (modulo) | Gate count (counter) |
|---|---|---|
| 13 | 472 | 401 |
| 59 | 554 | 401 |
| 97 | 580 | 401 |
| 179 | 643 | 401 |

Furthermore, if the ratio N is variable, a programmable modulo N circuit is required, with an even greater gate count.

BRIEF DESCRIPTION OF THE DRAWINGS

The accompanying drawings are included to provide a further understanding and are incorporated in and constitute a part of this specification. The drawings illustrate several embodiments of the electric circuit arrangement to control current generation, and together with the description serve to explain principles and the operation of the various embodiments.

FIG. 5 illustrates a table containing states of a random code generator, a counter and selected output to control a current generator circuit using dynamic element matching;

DETAILED DESCRIPTION OF ILLUSTRATIVE EMBODIMENTS

Figure 1:
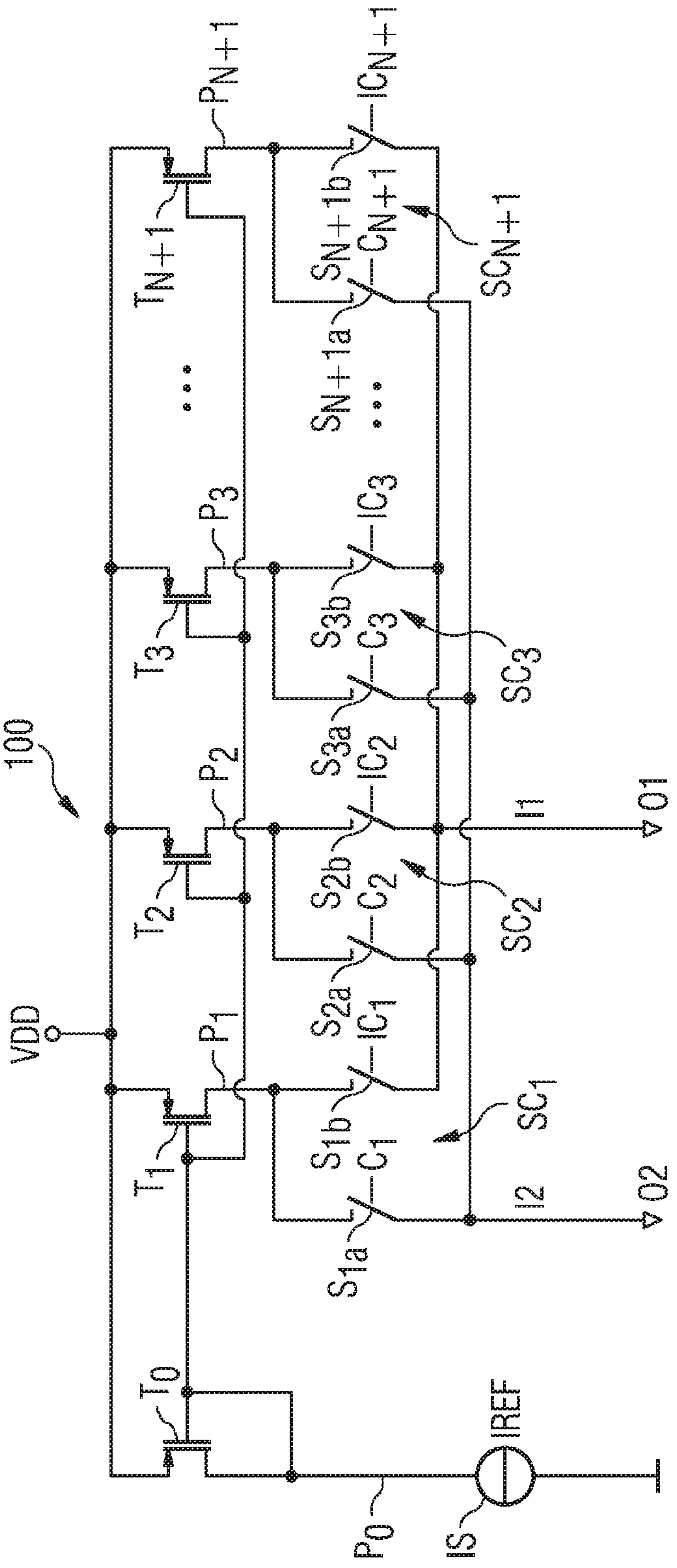
FIG. 1 shows an embodiment of a current generator circuit being comprising as a current mirror to generate an output current by dynamic element matching.

FIG. 1 illustrates an exemplified embodiment of a current generator circuit 100 comprising a current mirror. The current generator circuit comprises an input path $P_o$ including a transistor $T_o$ and a reference current source IS to generate a reference current IREF. The current generator circuit 100 further comprises a plurality of output current paths $P_1, \ldots, P_{N+1}$. Each of the output current paths $P_1, \ldots, P_{N+1}$ includes a respective electrical component $T_1, \ldots, T_{N+1}$ to define a current in the respective output current path. Furthermore, the current generator circuit 100 comprises a plurality of controllable switching circuit $SC_1, \ldots, SC_{N+1}$.

A respective one of the controllable switching circuits $SC_1, \ldots, SC_{N+1}$ is coupled to a respective one of the output current paths $P_1, \ldots, P_{N+1}$ to connect the respective electrical component $T_1, \ldots, T_{N+1}$ to an output terminal O1 of the current generator circuit wo to generate an output current I1. Each of the controllable switching circuits $SC_1, \ldots, SC_{N+1}$ comprises a pair of controllable switches respectively including a first controllable switch S1*a*, S2*a*, S3*a*, . . . , SN+1a and a respective second controllable switch S1*b*, S2*b*, S3*b*, . . . , SN+1b.

According to the embodiment of the current generator circuit wo shown in FIG. 1, the current mirror circuit includes a plurality of mirror transistors $T_1, \ldots, T_{N+1}$. Each of the output current paths $P_1, \ldots, P_{N+1}$ includes a respective one of the mirror transistors $T_1, \ldots, T_{N+1}$. The current generator circuit wo is configured to connect the respective mirror transistor $T_1, \ldots, T_{N+1}$ to the first output terminal O1 by the respective controllable switching circuit $SC_1, \ldots, SC_{N+1}$.

Furthermore, the respective controllable switching circuit $SC_1, \ldots, SC_{N+1}$ can be controlled such that one of the respective mirror transistors $T_1, \ldots, T_{N+1}$ is connected to a second output terminal O2 of the current generator circuit wo. By way of example, the mirror transistor $T_1$ of the current path $P_1$ may be connected to the output terminal O2 by operating the controllable switch S1*a* in a closed or low resistive/conductive state and by operating the controllable switch S1*b* in an open or high resistive/non-conductive state. Furthermore, the remaining mirror transistors $T_2, \ldots, T_{N+1}$ of the current mirror circuit can be connected to the first output terminal O1 by operating the controllable switches S2*b*, S3*b*, . . . , SN+1b in a closed or low resistive/conductive state and by operating the controllable switches S2*a*, S3*a*, . . . , SN+1a in an open or high resistive/non-conductive state.

FIG. 1 illustrates the current generator circuit wo comprising a current mirror circuit with P-type transistors. According to a possible alternative embodiment, the current mirror circuit 100 could also be implemented with N-type transistors. In this case, the current generator circuit would sink I1/I2. Basically, the current generator circuit can be implemented with transistors of the N- or P-type or with cascaded transistors. Furthermore, any type of mirror circuit can be adapted, as long as it can be decomposed into electrical components/unit elements that can be connected to the output terminal O1 and the output terminal O2 selectively.

Figure 2:
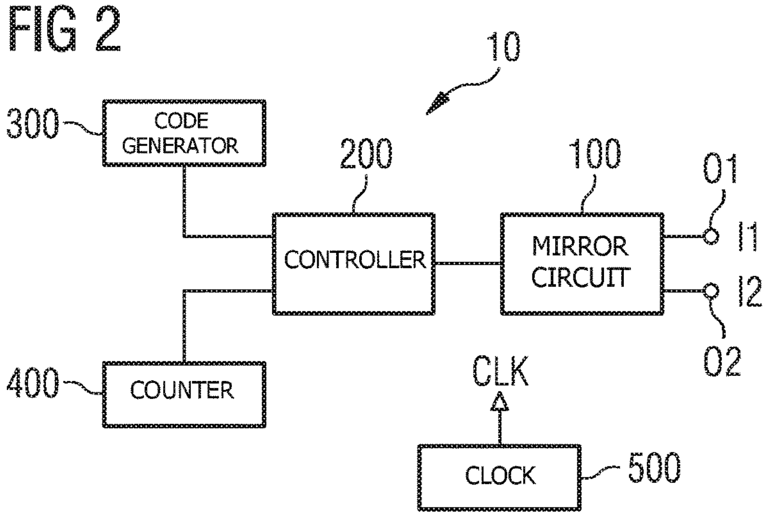
FIG. 2 shows a block diagram of an electric circuit arrangement to control current generation by a current generator circuit using dynamic element matching.

FIG. 2 illustrates a block diagram of an electric circuit arrangement 10 to control current generation by means of a dynamic element matching method. The electric circuit arrangement comprises the current generator circuit 100 which can be embodied as shown and explained with reference to FIG. 1.

The electric circuit arrangement 10 further comprises a controller 200 to generate control signals $C_1$, $IC_1$, . . . , $C_{N+1}$, $IC_{N+1}$ to control a respective one of the controllable switching circuits. The electric circuit arrangement 10 further comprises a random code generator 300 to generate random codes and a counter 400 to generate a count. The random code generator 300 is configured to provide a respective code derived from a respective one of the random codes.

Figure 3:
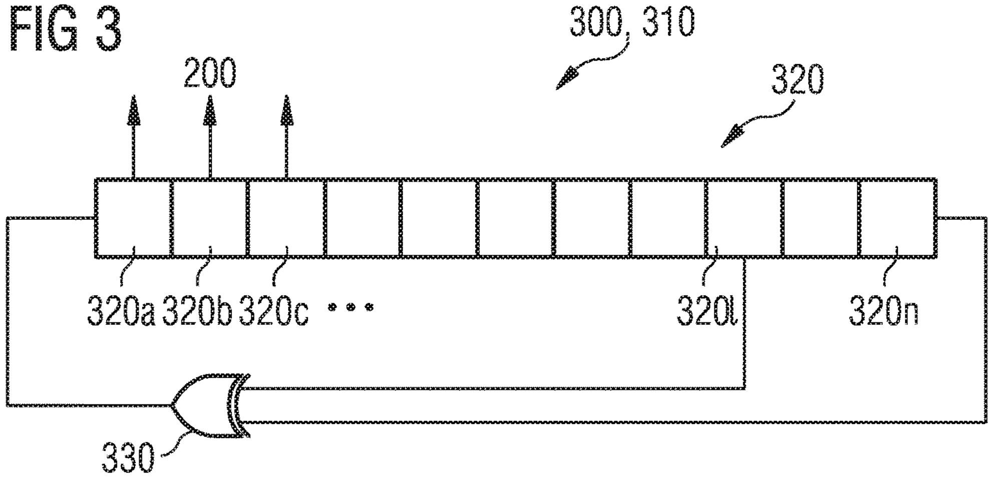
FIG. 3 shows an embodiment of a random code generator being configured as a linear feedback shift register to generate random codes.

FIG. 3 shows an embodiment of the random code generator 300. As shown in the exemplified embodiment of FIG. 3, the random code generator 300 is configured or comprises a linear feedback shift register (LFSR) 310. The linear feedback shift register 310 comprises a shift register 320 including a plurality of storage cells 320*a*, . . . , 320*n*. Each of the storage cells 320*a*, . . . , 320*n* is configured to store one bit of the respective random code generated by the linear feedback shift register.

The linear feedback shift register 310 is configured to provide the respective derived code from storage cells to evaluated, these storage cells being a portion of the plurality of all of the storage cells 320*a*, . . . , 320*n*. The respective derived code is provided in dependence on a respective storage state of the storage cells to be evaluated, for example the storage cells 320*a*, 320*b* and 320*c*. According to the illustrated embodiment of the linear feedback shift register 310, the first three storage cells of the shift register 320 are the cells which contain the derived code which is evaluated by the controller 200.

As shown in FIG. 3, the linear feedback shift register 310 further comprises a logic circuitry 330 which receives the storage content of at least two storage cells of the shift register 320. In the illustrated example of the linear feedback shift register 310, the logic circuitry 330 receives the storage content of the third-last storage cell 320*l* and the storage content of the last storage cell 320*n*. The storage content of these two storage cells is combined by the logic circuitry 330. The output of the logic circuitry 330 is connected to an input side of the shift register 320 so that a new storage content is moved in the first storage cell 320*a* of the shift register and the respective content of the other storage cells 320*b*, . . . , 320*n* is shifted to the right by one storage cell.

The use of a linear shift register for the random code generator 300 allows to generate a pseudo-random code which repeats with a long period.

The embodiment of the linear feedback shift register shown in FIG. 3 is only an example for the implementation of a code generator which may be used for the electric circuit arrangement 10. The particular implementation of the linear feedback shift register 310 depends from the chosen polynomial. As a result, the random code generator 300 based on the linear feedback shift register 310 can be advantageously adapted to the application in which the electric circuit arrangement 10 is used for current generation. In particular, the chosen polynomial and thus the realization of the linear feedback shift register can be adapted to the needed application purpose.

Another advantage is that the length of the generated pseudo-random sequence/code can be easily affected by the number X of the storage cells 320*a*, . . . , 320*n* of the shift register 320. The more storage cells that are provided for the shift register 320, the longer the repeating period for the pseudo-random sequence ($2^X-1$).

As shown in FIG. 2, the electric circuit arrangement 1 comprises a clock circuit 500 to generate a clock signal CLK between subsequent time steps. The random code generator 300 is clocked by the clock signal CLK such that the respective one of the random codes and the respective one of the derived codes is generated in a respective one of the time steps.

Referring to FIG. 2, the controller 200 is configured to select one of the respective derived code and the count depending on the derived code and to use the selected one of the respective derived code and the count provided by the counter 400 to generate a respective one of the control signals $C_1$, $IC_1$, . . . , $C_{N+1}$, $IC_{N+1}$ to control a respective one of the controllable switching circuits $SC_1$, . . . , $SC_{N+1}$ of the current generator circuit 100. The controller 200 is clocked by the clock signal CLK such that the respective derived code of the random code generator 300 or the count of the counter 400 is used in the respective one of subsequent time steps to generate the control signals $C_1$, $IC_1$, . . . $C_{N+1}$, $IC_{N+1}$.

The use of a clock circuit advantageously enables to operate the controller 200 and the random code generator 300 as clocked circuits. As a result, a new random code, and thus a new derived code, is provided by the random code generator 300 in every clock cycle. Furthermore, the switching state of the controllable switching circuits $SC_1$, . . . , $SC_{N+1}$ is changed by the controller 200 in every clock cycle so that the use of the electrical components, for example the mirror transistors, for the generation of the output current is changed every clock cycle by means of dynamic element matching. As a result, an output current can be generated by the current generator circuit 100 which is close to a predefined rational factor of the precise reference current IREF.

The controller 200 is configured to generate the control signals $C_1$, $IC_1$, . . . $C_{N+1}$, $IC_{N+1}$ such that one of the output current paths $P_1$, . . . , $P_{N+1}$ with its respective electrical component is connected to the second output terminal O2 and the remainder of the output current paths with their respective electrical component are connected to the first output terminal O1. Regarding the embodiment of the current generator circuit 100 being configured as a current mirror circuit shown in FIG. 1, the controller 200 is configured to generate the control signals to control the respective controllable switching circuits $SC_1$, . . . , $SC_{N+1}$ such that only one of the output current paths with its mirror transistor is connected to the output terminal O2, and the remainder of the output current paths with their respective current mirror are connected to the output terminal O1.

The proposed configuration of the electric circuit arrangement enables to provide the output current at the output terminal O1 as a sum of various partial currents which are generated by the electrical components being arranged in the respective output current path. The amount of the output current is thus defined by the number of partial currents to be summed at the output terminal O1 and, in particular, by the geometrical size of the electrical component, for example the mirror transistor, being included in the respective output current path.

According to an embodiment of the electric circuit arrangement 10, the random code generator 300 may provide the random codes and thus also the derived codes in a hexadecimal or binary format which can easily be stored in the storage cells 320*a*, . . . , 320*n* of the shift register 320. The controller 200 is configured to use the derived code to decide if the derived code generated by the random code generator 300 or the count generated by the counter has to be selected to generate the control signals $C_1$, $IC_1$, . . . $C_{N+1}$, $IC_{N+1}$ to control the controllable switching circuits $SC_1$, . . . , $SC_{N+1}$ of the current generator circuit 100.

According to a possible embodiment of the electric circuit arrangement 10, the controller 200 is configured to use the respective derived code provided from the random code generator 300 to generate the control signals $C_1$, $IC_1$, . . . $C_{N+1}$, $IC_{N+1}$ when a decimal representation C of the derived code is lower than the number N of the remaining output current paths. Furthermore, the controller 200 is configured to use the count provided by the counter 400 to generate the control signals $C_1$, $IC_1$, . . . $C_{N+1}$, $IC_{N+1}$ when the decimal representation C of the derived code is larger than the number N of remaining output current paths of the current generator circuit 100.

The proposed embodiment of the controller 200 advantageously allows to combine a random code generation of a random code generator being configured as a linear feedback shift register with the code generation of a counter. Assuming the random code generator 300 comprises X storage cells of which M storage cells are to be evaluated to provide the derived code, the linear feedback shift register generates $2^M$ derived codes.

Since the generated $2^M$ derived codes are larger than the number N+1 of output current paths but only N+1 codes are required to control the controllable switching circuits $SC_1$, . . . , $SC_{N+1}$, the random code generator 300 generates illegal/non-permitted derived codes. The generation of the control signals $C_1$, $IC_1$, . . . $C_{N+1}$, $IC_{N+1}$ in dependence on an illegal code generated by the random code generator 300 has to be avoided. In particular, if an illegal code, for example an non-permitted binary code, having a decimal representation being larger than the number N of the remaining output current paths of the current generator circuit 100 to be connected to the output terminal O1 is generated by the random code generator 300, the controller 200 advantageously selects the count generated by the counter 400 to determine the code used to generate the control signals $C_1$, $IC_1$, . . . , $C_{N+1}$, $IC_{N+1}$ to control the controllable switching circuits $SC_1$, . . . , $SC_{N+1}$ of the current generator circuit 100.

According to an embodiment of the electric circuit arrangement 10, the linear feedback shift register 310 is configured such that the storage cells to be evaluated, for example the storage cells 310*a*, 310*b* and 310*c*, are provided with a number M which fulfils the condition $2^M$ being larger than N+1, wherein N+1 is the number of the output current paths $P_1$, . . . , $P_{N+1}$ of the current generator circuit 100.

This configuration of the linear feedback shift register 310 allows to generate a number of derived codes being larger than the number of available output current paths $P_1$, . . . , $P_{N+1}$ of the current generator circuit 100. Thus, the linear feedback shift register 310 allows to generate a large number of random codes by avoiding repeating codes with a small period, as this is typical for a rotation-based dynamic element matching.

According to an embodiment of the electric circuit arrangement 10, the counter 400 is configured to increase the count when the count is used by the controller 200 to generate the control signals $C_1$, $IC_1$, . . . $C_{N+1}$, $IC_{N+1}$. In particular, the counter 400 may be configured to increase the count between a start value and a final value, wherein the number of counts between the start value and the final value corresponds to the number of output current paths $P_1$, . . . , $P_{N+1}$ of the current generator circuit 100.

This configuration of the counter 400 advantageously allows to implement the counter 400 with low area consumption, wherein the complexity of the counter 400 is directly dependent and adapted to the current generator circuit and, in particular, to the number of output current paths of the current generator circuit 100. Moreover, the use of the counter 400 to generate a count which is used as an auxiliary code allows to overcome the limitation of the generation of $2^M$ codes given by the linear feedback shift register alone. Furthermore, the generation of an auxiliary code by the counter allows to extend the dynamic element matching method to an arbitrary number of codes at run time.

In case an application requires at least two current mirror circuits to be provided, and a correlation between the random codes generated by the current mirror circuits has to be avoided, a second counter dedicated to the additional current generator circuit may be included, and the controller can apply the same algorithm to both outputs. The input code from the linear feedback shift register has to be different, so that a different tap of its outputs has to be selected.

Figure 4:
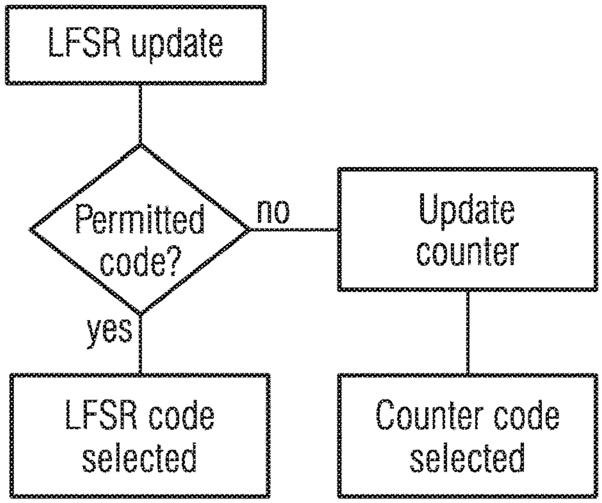
FIG. 4 shows a control algorithm to select a code to control controllable switching circuits of a current generator circuit using dynamic element matching.

The functionality of the electric circuit arrangement 10 is explained in the following with reference to the control algorithm illustrated in FIG. 4 and the list of states of the random code generator 300 and the counter 400 illustrated in FIG. 5.

The electric circuit arrangement 10 is used to control current generation such that the current generator circuit 100 generates an output current I1 with a defined ratio in relation to the reference current IREF or the output current I2. The basing sizing parameter is the target current ratio N. In order to generate an output current I1=N*I2, one of the output current paths and thus one of the electrical components, for example one of the mirror transistors, has to be connected to the output terminal O2, whereas the other output current paths and thus the remaining electrical components, for example the remainder of the mirror transistors, have to be connected to the output terminal O1.

Referring to FIG. 1, the current generator circuit 100 has N+1 output current paths/control lines, wherein the respective controllable switching circuits $SC_1$, . . . , $SC_{N+1}$ decide, which one of the electrical components, for example which one of the unit current sources/mirror transistors $T_1$, . . . , $T_N$, has to be connected to the output terminal $O_1$ or the output terminal $O_2$.

The purpose of the random code generator 300, for example the linear feedback shift register 310, is to generate a pseudo-random code/number of width X. From the possible X outputs of the random code generator 300, only a number M of storage cells to be evaluated are used to generate a derived code from the generated random code. As a consequence, the random code generator 300 may generate a number of $2^M$ possible derived codes. As explained above, the number $2^M$ of possible derived codes is higher than the number of the output current paths $P_1$, . . . , $P_{N+1}$ or the number of the electrical components, for example the mirror transistors, $T_1$, . . . , $T_{N+1}$, of the current generator circuit 100.

The controller 200 is configured to update the random code generator 300, for example the linear feedback shift register 310, periodically in every clock cycle, according to the requirements of the application. At every update, the derived code corresponding to the storage content of the number M of storage cells of the shift register 320 is compared with the number N. The controller 200 evaluates the derived code, for example a binary code. If the controller 200 detects that a decimal representation C of the derived code is lower than or equal to N (C≤N), then the derived code generated by the random code generator 300 is considered by the controller 200 as permitted code and is selected by the controller to generate the control signals $C_1$, $IC_1$, . . . $C_{N+1}$, $IC_{N+1}$ to control the controllable switching circuits $SC_1$, . . . , $SC_{N+1}$ of the current generator circuit 100.

On the other hand, if the controller 200 detects that the decimal representation C of the derived code generated by the random code generator 300 is larger than N (C>N), then the derived code is considered by the controller 200 as non-permitted code, and the controller 200 selects the count of the auxiliary counter 400 counting from 0 to N to generate the control signals $C_1$, $IC_1$, . . . $C_{N+1}$, $IC_{N+1}$ to control the controllable switching circuits $SC_1$, . . . , $SC_{N+1}$. Thereafter, the count of the counter 400 is increased.

FIG. 5 illustrates an example of a list of states of the random code generator 300 and the counter 400 which are evaluated by the controller 200 to detect, if a derived code is a permitted or non-permitted code, and to select the derived code from the random code generator 300, if the derived code is considered as permitted code, and to select the count from the counter 400 to generate the control signals $C_1$, $IC_1$, . . . $C_{N+1}$, $IC_{N+1}$ to control the controllable switching circuits $SC_1$, . . . , $SC_{N+1}$, if the derived code is considered as a non-permitted code.

Referring to the illustrated exemplary list of FIG. 5 and assuming the random code generator 300 comprises the linear shift register 310, the linear feedback shift register 310 comprises twenty storage cells (X=20) to generate a random code which is given in the first column of the table of FIG. 5 in a hexadecimal format. The second column of the table of FIG. 5 shows a decimal representation of the derived code of the storage cells to be evaluated, for example the three storage cells of the linear feedback shift register 310.

According to the example in the third row of the table, the random code generator generates the random code DB546. The decimal representation of a derived code with M=3 storage cells to be evaluated associated to the hexadecimal code DB546 is "6" (row 3, column 2 of the table). Assuming that the current generator circuit 100 has six output current paths $P_1$, . . . , $P_6$ or six electrical components, for example six mirror transistors, $T_1$, . . . , $T_6$, i.e. N=6, the controller selects the output of the counter 400 with the count "o" to generate the control signals to control the controllable switching circuits $SC_1$, . . . , $SC_6$ of the current generator circuit 100, because the condition C>N is fulfilled.

The subsequent rows 4 to 5 of the table of FIG. 5 respectively illustrate an example, where the condition C≤N is fulfilled, so that the controller 200 selects the derived code generated from the random code generator 300 to generate the control signals to control the controllable switching circuits $SC_1$, . . . , $SC_6$ of the current generator circuit 100.

Figure 6A:
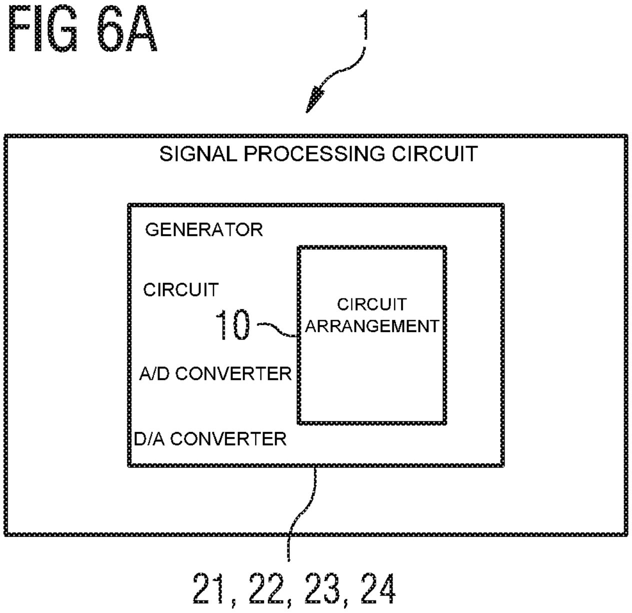
FIG. 6A shows an embodiment of a signal processing circuit comprising an electric circuit arrangement to control current generation.

FIG. 6A shows an example of an application that uses the electric circuit arrangement 10 to control current generation. According to the illustrated embodiment of an application, the electric circuit arrangement 10 is included in a signal processing circuit 1. The signal processing circuit 1 comprises at least one of a bias current generator 21 and/or a bandgap reference circuit 22 and/or a digital-to-analog converter 23 and/or an analog-to-digital converter 24. The electric circuit arrangement 10 may be included in at least one of the bias current generator 21 and/or the bandgap reference circuit 22 and/or the digital-to-analog converter 23 and/or the analog-to-digital converter 24. In particular, the analog-to-digital converter 24 can be embodied as a sigma-delta analog-to-digital converter.

Figure 6B:
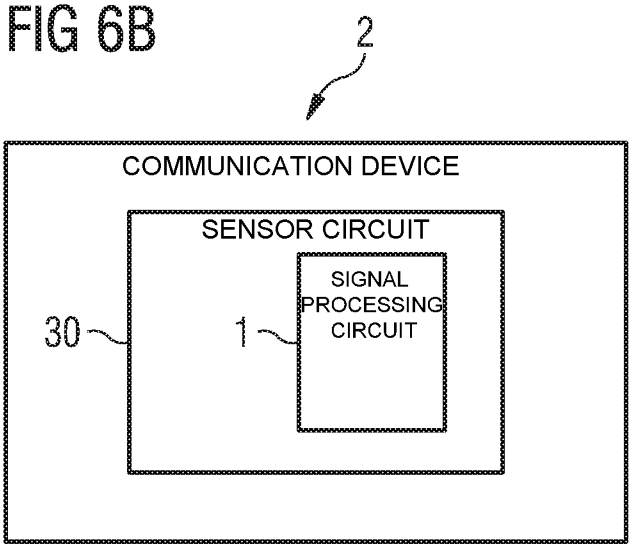
FIG. 6B shows an embodiment of a communication device comprising an electric circuit arrangement to control current generation.

FIG. 6B shows another application comprising a communication device 2 comprising a sensor circuit 30. The signal processing circuit 1 is included in the sensor circuit 30. The sensor circuit 30 can be embodied, for example, as one of a temperature sensor, a pressure sensor, a humidity sensor or a resistance measurement sensor, etc.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. An electric circuit arrangement comprising:

a current generator circuit having a first output terminal, the current generator circuit configured to generate an output current;

a controller configured to generate control signals to control the current generator circuit;

a random code generator configured to generate random codes; and a counter configured to generate a count, wherein the current generator circuit comprises a plurality of output current paths and a plurality of controllable switching circuits, wherein each of the output current paths includes a respective electrical component to define a current in a respective output current path, wherein a respective one of the controllable switching circuits is coupled to a respective one of the output current paths to connect the respective electrical component to the first output terminal, wherein the random code generator is configured to provide a respective code derived from a respective one of the random codes, and wherein the controller is configured to use the respective derived code or the count depending on the derived code to generate a respective one of the control signals to control a respective one of the controllable switching circuits of the current generator circuit.

2. The electric circuit arrangement of claim 1, wherein the current generator circuit has a second output terminal, and wherein the controller is configured to generate the control signals such that one of the output current paths is connected to the second output terminal and a remainder of the output current paths are connected to the first output terminal.

3. The electric circuit arrangement of claim 1, wherein the counter is configured to increase the count, when the count is used by the controller to generate the control signals.

4. The electric circuit arrangement of claim 1, wherein the counter is configured to increase the count between a start value and a final value, and wherein a number of counts between the start value and the final value corresponds to a number of output current paths of the current generator circuit.

5. The electric circuit arrangement of claim 1, wherein the random code generator comprises a linear feedback shift register.

6. The electric circuit arrangement of claim 5, wherein the linear feedback shift register comprises a shift register including a plurality of storage cells, wherein each of the storage cells is configured to store one bit of the respective random code, wherein the linear feedback shift register is configured to provide the respective derived code from storage cells to be evaluated, the storage cells to be evaluated being a portion of the plurality of storage cells, and wherein the linear feedback shift register is configured to provide the respective derived code depending on a respective storage state of the storage cells to be evaluated.

7. The electric circuit arrangement of claim 6, wherein the linear feedback shift register is configured such that the storage cells to be evaluated are provided with a number M which fulfills a condition $2^M > N+1$, and wherein N+1 is a number of the output current paths of the current generator circuit.

8. The electric circuit arrangement of claim 1, further comprising:

a clock circuit configured to generate a clock signal between subsequent time steps, wherein the random code generator is clocked by the clock signal such that a respective one of the random codes and a respective one of the derived codes is generated in a respective one of the time steps, and wherein the controller is clocked by the clock signal such that the respective derived code or the count is used in the respective one of the time steps to generate the control signals.

9. The electric circuit arrangement of claim 1, wherein the current generator circuit comprises a current mirror circuit including a plurality of mirror transistors, wherein each of the output current paths includes a respective one of the mirror transistors, and wherein the current generator circuit is configured to connect the respective mirror transistor to the first output terminal by the respective controllable switching circuit.

10. The electric circuit arrangement of claim 9, wherein a respective one of the controllable switching circuits is coupled in series with a respective one of the mirror transistors.

11. A signal processing circuit comprising:

the electric circuit arrangement of claim 1; and at least one of a bias current generator, a band gap reference circuit, a digital to analogue converter and an analogue to digital converter, wherein the electric circuit arrangement is included in at least one of the bias current generator, the band gap reference circuit, the digital to analogue converter and the analogue to digital converter.

12. A communication device comprising:

the signal processing circuit according to claim 11; and a sensor circuit, wherein the signal processing circuit is included in the sensor circuit.

13. The communication device of claim 12, wherein the analogue to digital converter of the signal processing circuit is embodied as a sigma-delta analogue to digital converter, and wherein the sensor circuit is embodied as one of a temperature sensor circuit, a pressure sensor circuit, a humidity sensor circuit or a resistance measurement circuit.

14. An electric circuit arrangement comprising:

a current generator circuit having a first output terminal, the current generator circuit configured to generate an output current;

a controller configured to generate control signals to control the current generator circuit;

a random code generator configured to generate random codes; and a counter configured to generate a count, wherein the current generator circuit comprises a plurality of output current paths and a plurality of controllable switching circuits, wherein each of the output current paths includes a respective electrical component to define a current in a respective output current path, wherein a respective one of the controllable switching circuits is coupled to a respective one of the output current paths to connect the respective electrical component to the first output terminal, wherein the random code generator is configured to provide a respective code derived from a respective one of the random codes, and wherein the controller is configured to:

use the respective derived code or the count depending on the derived code to generate a respective one of the control signals to control a respective one of the controllable switching circuits of the current generator circuit, and use the respective derived code to generate the control signals, when a decimal representation of the derived code is lower than a number of a remainder of the output current paths.

15. An electric circuit arrangement comprising:

a current generator circuit having a first output terminal, the current generator circuit configured to generate an output current;

a controller configured to generate control signals to control the current generator circuit;

a random code generator configured to generate random codes; and a counter configured to generate a count, wherein the current generator circuit comprises a plurality of output current paths and a plurality of controllable switching circuits, wherein each of the output current paths includes a respective electrical component to define a current in a respective output current path, wherein a respective one of the controllable switching circuits is coupled to a respective one of the output current paths to connect the respective electrical component to the first output terminal, wherein the random code generator is configured to provide a respective code derived from a respective one of the random codes, and wherein the controller is configured to:

use the respective derived code or the count depending on the derived code to generate a respective one of the control signals to control a respective one of the controllable switching circuits of the current generator circuit, and use the count to generate the control signals, when a decimal representation of the derived code is larger than a number of a remainder of the output current paths.

* * * * *